United States Patent
Kim et al.

(10) Patent No.: US 11,062,228 B2
(45) Date of Patent: Jul. 13, 2021

(54) TRANSFER LEARNING TECHNIQUES FOR DISPARATE LABEL SETS

(71) Applicant: Microsoft Technology Licensing, LLC, Redmond, WA (US)

(72) Inventors: Young-Bum Kim, Bellevue, WA (US); Ruhi Sarikaya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 682 days.

(21) Appl. No.: 14/792,269

(22) Filed: Jul. 6, 2015

(65) Prior Publication Data

US 2017/0011306 A1    Jan. 12, 2017

(51) Int. Cl.
*G06N 20/00* (2019.01)

(52) U.S. Cl.
CPC .................... *G06N 20/00* (2019.01)

(58) Field of Classification Search
CPC ......... G06F 17/30011; G06F 17/30598; G06F 17/30722; G06F 17/30303; G06F 17/50; G06F 17/2775; G06F 17/30; G06F 17/27; G06Q 50/18; G06N 99/005; G06N 20/00; G06N 99/05; G06K 9/6218; G06K 9/46; G06K 9/6201; G06K 9/6215; G06T 7/11; G06T 7/73; G06T 2207/30204; G05B 2219/32201; G05B 23/0221; G10L 15/063; G10L 15/06; G10L 15/18
See application file for complete search history.

(56) References Cited

U.S. PATENT DOCUMENTS

| | | | |
|---|---|---|---|
| 6,999,925 B2 | 2/2006 | Fischer et al. | |
| 7,280,987 B2 | 10/2007 | Chen et al. | |
| 7,444,282 B2 | 10/2008 | Choo et al. | |
| 7,613,665 B2 | 11/2009 | Chen et al. | |
| 7,624,020 B2 * | 11/2009 | Yamada | G06F 40/42 704/277 |
| 7,634,409 B2 | 12/2009 | Kennewick et al. | |

(Continued)

FOREIGN PATENT DOCUMENTS

| | | |
|---|---|---|
| CN | 103400577 A | 11/2013 |
| CN | 103456299 A | 12/2013 |

(Continued)

OTHER PUBLICATIONS

Pacharawongsakda et al. "Multi-Label Classification Using Dependent and Independent Dual Space Reduction", The computer Journal, 2013, pp. 1113-1135.*

(Continued)

*Primary Examiner* — Li Wu Chang

(57) ABSTRACT

Examples of the present disclosure describe systems and methods of transfer learning techniques for disparate label sets. In aspects, a data set may be accessed on a server device. The data set may comprise labels and word sets associated with the labels. The server device may induce label embedding within the data set. The embedded labels may be represented by multi-dimensional vectors that correspond to particular labels. The vectors may be used to construct label mappings for the data set. The label mappings may be used to train a model to perform domain adaptation or transfer learning techniques. The model may be used to provide results to a statement/query or to train a different model.

20 Claims, 9 Drawing Sheets

(56) References Cited

U.S. PATENT DOCUMENTS

| | | | |
|---|---|---|---|
| 7,805,300 | B2 | 9/2010 | Gorin et al. |
| 7,835,910 | B1 | 11/2010 | Hakkani-Tur et al. |
| 8,073,879 | B2 | 12/2011 | Meijer et al. |
| 8,185,399 | B2 | 5/2012 | Di Fabbrizio et al. |
| 8,234,312 | B2 | 7/2012 | Thomas |
| 8,380,511 | B2 | 2/2013 | Cave et al. |
| 8,548,805 | B2 | 10/2013 | Chotimongkol et al. |
| 8,566,098 | B2 | 10/2013 | Syrdal et al. |
| 8,676,866 | B2 | 3/2014 | Lemcke et al. |
| 8,751,240 | B2 | 6/2014 | Lewis et al. |
| 8,775,158 | B2 | 7/2014 | Sakao et al. |
| 8,818,808 | B2 | 8/2014 | Hakkani-Tur et al. |
| 8,856,052 | B2 | 10/2014 | Chenthamarakshan et al. |
| 8,954,461 | B2 | 2/2015 | Ware et al. |
| 8,996,371 | B2 | 3/2015 | Hurvitz et al. |
| 9,053,703 | B2 | 6/2015 | Weinstein et al. |
| 9,077,949 | B2 * | 7/2015 | Haseyama .......... G06F 17/3002 |
| 9,653,093 | B1 | 5/2017 | Matsoukas et al. |
| 2006/0036430 | A1 | 2/2006 | Hu |
| 2006/0074634 | A1 | 4/2006 | Gao et al. |
| 2007/0016399 | A1 * | 1/2007 | Gao ................ G06F 17/2818 704/5 |
| 2008/0077392 | A1 | 3/2008 | Kamatani et al. |
| 2008/0319748 | A1 | 12/2008 | Nakano et al. |
| 2010/0332520 | A1 * | 12/2010 | Lu ................ G06F 17/30722 707/769 |
| 2011/0093268 | A1 | 4/2011 | Gorin et al. |
| 2011/0225153 | A1 | 9/2011 | Haseyama |
| 2011/0302111 | A1 | 12/2011 | Chidlovskii |
| 2012/0232898 | A1 | 9/2012 | Di Fabbrizio et al. |
| 2012/0290293 | A1 | 11/2012 | Hakkani-Tur et al. |
| 2013/0066632 | A1 | 3/2013 | Conkie et al. |
| 2013/0091184 | A1 | 4/2013 | Alexe et al. |
| 2013/0103382 | A1 | 4/2013 | Kim et al. |
| 2014/0022426 | A1 | 1/2014 | Minami et al. |
| 2014/0058983 | A1 | 2/2014 | Alexander |
| 2014/0059030 | A1 | 2/2014 | Hakkani-Tur et al. |
| 2014/0149121 | A1 | 5/2014 | Di Fabbrizio et al. |
| 2014/0164299 | A1 | 6/2014 | Sainath et al. |
| 2014/0201126 | A1 | 7/2014 | Zadeh et al. |
| 2014/0207777 | A1 | 7/2014 | Palmert et al. |
| 2014/0222422 | A1 | 8/2014 | Sarikaya et al. |
| 2014/0278424 | A1 | 9/2014 | Deng et al. |
| 2014/0288935 | A1 | 9/2014 | Lewis et al. |
| 2014/0337026 | A1 | 11/2014 | Ichikawa et al. |
| 2014/0358829 | A1 | 12/2014 | Hurwitz |
| 2014/0379326 | A1 | 12/2014 | Sarikaya et al. |
| 2015/0019202 | A1 | 1/2015 | Tremblay et al. |
| 2016/0078339 | A1 | 3/2016 | Li et al. |
| 2017/0011738 | A1 | 1/2017 | Senior et al. |
| 2017/0061966 | A1 | 3/2017 | Marcheret et al. |
| 2017/0083829 | A1 | 3/2017 | Kang et al. |
| 2019/0051290 | A1 | 2/2019 | Li et al. |

FOREIGN PATENT DOCUMENTS

| | | |
|---|---|---|
| CN | 103544705 A | 1/2014 |
| CN | 103886305 A | 6/2014 |
| CN | 103945533 A | 7/2014 |
| CN | 103955702 A | 7/2014 |
| CN | 104156438 A | 11/2014 |
| CN | 104715021 A | 6/2015 |
| EP | 2261823 A2 | 12/2010 |
| RU | 2418321 C2 | 5/2011 |
| TW | 201430830 A | 8/2014 |
| WO | 2014114116 A1 | 7/2014 |

OTHER PUBLICATIONS

Brause te al. "Neural Data Mining for Credit Card Fraud Detection", TAI, 2008, pp. 4.*

Pan et al. "Cross-Domain Sentiment Classification via Spectral Feature Alignment", WWW, 2010, pp. 751-760.*

Dilek Hakkani-Tur et al., "A Discriminative Classification-Based Approach to Information State Updates for a Multi-Domain Dialog System", Interspeech 2012, 13th Annual Conference of the International Speech Communication Association, Sep. 9, 2012, XP055160586, Portland, Oregon, USA.

Dredze et al., "Online Methods for Multi-Domain Learning and Adaptation", Published Date: Oct. 25, 2008, In Proceedings of Conference on Empirical Methods in Natural Language Processing, 9 pgs.

El-Kahky Ali et al., "Extending domain coverage of language understanding systems via intent transfer between domains using knowledge graphs and search query click logs", 2014 IEEE International Conference on Acoustics, Speech and Signal Processing (ICASSP), IEEE, May 4, 2014, pp. 4067-4071.

Kaya et al., "Canonical Correlation Analysis and Local Fisher Discriminant Analysis based Multi-View Acoustic Feature Reduction for Physical Load Prediction", Published Date: Sep. 14, 2014, In Proceedings of 15th Annual Conference of International Speech Communication Association, 5 pgs.

Komatani, et al., "Multi-Domain Spoken Dialogue System with Extensibility and Robustness against Speech Recognition Errors", In Proceedings of 7th SIGdial Workshop on Discourse and Dialogue, Jul. 2006, 9 pages.

Lee, et al., "Example-Based Dialog Modeling for Practical Multi-Domain Dialog System", In Proceedings of Speech Communication, vol. 51, Jan. 23, 2009, 19 pages.

Lee, et al., "Recent Approaches to Dialog Management for Spoken Dialog Systems", In Journal of Computing Science and Engineering, vol. 4, Issue 1, Mar. 18, 2010, 22 pages.

Liu, Xiaodong et al., "Representation Learning Using Multi-Task Deep Neural Networks for Semantic Classification and Information Retrieval", Retrieved Date: Apr. 1, 2015, In Proceedings of Conference of the North American Chapter of the Association for Computational Linguistics—Human Language Technologies, 10 pgs.

Oh, et al., "Stochastic Natural Language Generation for Spoken Dialog Systems", In Proceedings of Computer Speech and Language, vol. 16, Jan. 2012, 21 pages.

PCT International Search Report and Written Opinion in International Application PCT/US2014/013469, dated Jan. 21, 2015, 10 pgs.

PCT Second Written Opinion in International Application PCT/US2014/013469, dated May 29, 2015, 6 pgs.

Porzel, et al., "Towards Context-adaptive Natural Language Processing Systems", In Proceedings of Computational Linguistics for the New Millenium: Divergence or Synergy, May 2002, 12 pages.

Ries, et al., "Dialogue Act Modeling for Automatic Tagging and Recognition of Conversational Speech", In Proceedings of Association for Computational Linguistics, vol. 26, Issue 3, Sep. 2000, 35 pages.

Sun, Liang et al., "Canonical Correlation Analysis for Multi-Label Classification: A Least Squares Formulation, Extensions and Analysis", Published Date: Aug. 26, 2010, In Proceedings of IEEE Transactions on Pattern Analysis and Machine Intelligence, vol. 33, Issue 1, 13 pgs.

Tao, Liang et al., "Exploring Shared Subspace and Joint Sparsity for Canonical Correlation Analysis", Published Date: Nov. 3, 2014, In Proceedings of 23rd ACM International Conference on Conference on Information and Knowledge Management, 4 pgs.

U.S. Appl. No. 13/758,683, Amendment and Response filed Feb. 20, 2015, 10 pgs.

U.S. Appl. No. 13/758,683, Office Action dated Nov. 20, 2014, 10 pgs.

U.S. Appl. No. 13/758,683, Office Action dated May 4, 2015, 12 pgs.

Wang et al., "Heterogeneous Domain Adaptation Using Manifold Alignment", Published Date: Jul. 16, 2011, In Proceedings of International Joint Conference on Artificial Intelligence, vol. 22, No. 1, 6 pgs.

Yeh, Yi Ren et al., "Heterogeneous Domain Adaptation and Classification by Exploiting the Correlation Subspace", Published Date: May 2014, Proceedings: In Proceedings of IEEE Transactions on Image Processing, vol. 23, Issue 5, 10 pgs.

(56) References Cited

OTHER PUBLICATIONS

PCT International Search Report and Written Opinion in International Application PCT/US2016/040925, dated Oct. 13, 2016, 14 pgs.

Collobert, Ronan et al., "A unified architecture for natural language processing: deep neural networks with multitask learning", Paper accepted at the 25th International Conference on Machine Learning (ICML'08) to be held Jul. 5-9, 2008, May 2, 2008, Retrieved from the Internet: URL:http://icml2008.cs.helsinki.fi/papers/391.pdf[retrieved on Feb. 28, 2014], 8 pages.

Jeong, M. et al., "Multi-domain spoken language understanding with transfer learning", Speech Communication, Elsevier Science Publishers, Amsterdam, NL, vol. 51, No. 5, May 1, 2009, pp. 412-424, [retrieved on Jan. 14, 2009].

Daume, Hal, III, "Frustratingly Easy Domain Adaptation", Proceedings of the 45th Annual Meeting of the Association of Computational Linguistics, Jul. 10, 2009, pp. 256-263, XP055093530, Retrieved from the Internet: URL:http://arxiv.org/abs/0907.1815, p. 256-263.

Pan, Sinno Jialin et al., "A Survey on Transfer Learning", IEEE Transactions on Knowledge and Data Engineering, IEEE Service Center, Los Alamitos, CA, US, vol. 22, No. 10,Oct. 1, 2020, pp. 1345-1359.

Kim, Young-Bum et al., "New Transfer Learning Techniques for Disparate Label Sets", Proceedings of the 53rd Annual Meeting of the Association for Computational Linguistics and the 7th International Joint Conference on Natural Language Processing,Jul. 26, 2015, pp. 473-482.

PCT 2nd International Written Opinion in PCT/US2016/040925, dated Jun. 14, 2017, 7 pages.

U.S. Appl. No. 13/758,683, Amendment and Response filed Aug. 7, 2015, 12 pgs.

U.S. Appl. No. 13/758,683, Notice of Allowance dated Aug. 28, 2015, 8 pgs.

U.S. Appl. No. 13/758,683, Notice of Allowance dated Oct. 23, 2015, 8 pgs.

PCT International Preliminary Report on Patentability in PCT/US2016/040925, dated Sep. 15, 2017, 8 pages.

"ETSI noise", Retrieved From: https://docbox.etsi.org/stq/Open/Eg%20202%20396-1%20Background%20noise%20database/Binaural_Signals, Jul. 5, 2017, 2 pages.

"Final Office Action Issued in U.S. Appl. No. 14/853,485", dated Oct. 30, 2018, 39 Pages.

"Non Final Office Action Issued in U.S. Appl. No. 14/853,485", dated May 29, 2018, 42 Pages.

"Office Action Issued in European Patent Application No. 14901677.6", dated Jan. 26, 2018, 6 pages.

"Supplementary European Search Report Issued in European Patent Application No. 14901677.6", dated Dec. 19, 2017, 5 Pages.

"Non-Final Office Action Issued in U.S. Appl. No. 15/675,249", dated Aug. 28, 2018, 21 Pages.

"Office Action Issued in Chinese Patent Application No. 201480068343.X", dated Oct. 8, 2018, 13 Pages.

Zhou, et al., "A Cluster-Based Multiple Deep Neural Networks Method for Large Vocabulary Continuous Speech Recognition", In Proceedings of IEEE International Conference on Acoustics, Speech and Signal Processing (ICASSP), May 26, 2013, pp. 6650-6654.

"Office Action Issued in Japanese Patent Application No. 2017-513728", dated Aug. 30, 2018, 5 Pages.

Acero, et. al, "Robust Speech Recognition by Normalization of the Acoustic Space", In Proceedings of International conference on Acoustics, Speech, and Signal Processing, Apr. 14, 1991, 4 Pages.

Asami, et al., "Domain adaptation of DNN acoustic models using knowledge distillation", In Proceedings of IEEE International Conference on Acoustics, Speech and Signal Processing, Mar. 5, 2017, 5 Pages.

Ba, et al., "Do Deep Nets Really Need to be Deep?", In Proceedings of the 27th International Conference on Neural Information Processing Systems, Dec. 8, 2014, 6 Pages.

Benesty, Michael, "How many layers are required to be called deep neural network?", Retrieved from: www.quora.com/How-many-layers-are-required-to-be-called-deep-neural-network?, Dec. 20, 2015, 1 Page.

Bucilu, et al., "Model Compression", In Proceedings of the 12th ACM SIGKDD International Conference on Knowledge Discovery and Data Mining, Aug. 20, 2006, 7 Pages.

Ciresan, et al., "Multi-Column Deep Neural Network for Traffic Sign Classification", In Proceedings of the Neural Networks, vol. 32, Aug. 2012, 15 Pages.

Dahl, et al., "Context-Dependent Pre-Trained Deep Neural Networks for Large-Vocabulary Speech Recognition", In IEEE Transactions on Audio, Speech and Language Processing, vol. 20, Issue No. 1, Jan. 1, 2012, 13 Pages.

Dauphin, et al., "Identifying and attacking the saddle point problem in high-dimensional non-convex optimization", In Proceedings of Advances in neural information processing systems, Jun. 10, 2014, 14 Pages.

Deng, et al., "Recent Advances in Deep Learning for Speech Research at Microsoft", In Proceedings of IEEE International Conference on Acoustics, Speech and Signal Processing, May 26, 2013, 5 Pages.

Fainberg, et al., "Improving Children's Speech Recognition Through Out-of-Domain Data Augmentation", In Proceedings of 17th Annual Conference International Speech Communication Association, Sep. 6, 2016, 5 Pages.

Heigold, et al., "Equivalence of Generative and Log-Linear Models", In Proceedings of IEEE Transactions on Audio, Speech, and Language Processing, vol. 19, Issue 5, Jul. 2011, pp. 1138-1148.

Hinton, et al., "Deep Neural Networks for Acoustic Modeling in Speech Recognition", In Proceedings of the IEEE Signal Processing Magazine, vol. 29, Issue 6, Apr. 27, 2012, 27 Pages.

Hinton, et al., "Distilling the Knowledge in a Neural Network", In Journal of Computing Research Repository, Mar. 9, 2015, 9 Pages.

Hirsch, et al., "The Aurora Experimental Framework for the Performance Evaluation of Speech Recognition Systems under Noisy Conditions", In Proceedings of Automatic Speech Recognition: Challenges for the new Millenium ISCA Tutorial and Research Workshop, Sep. 18, 2000, 8 Pages.

Hopper, T, "Cross Entropy and KL Divergence", Retrieved from: https://tdhopper.com/blog/cross-entropy-and-kl-divergence/, Sep. 4, 2015, 3 Pages.

Jaitly, et al., "Application of Pretrained Deep Neural Networks to Large Vocabulary Speech Recognition", In Proceedings of 13th Annual Conference of the International Speech Communication Association, Sep. 9, 2012, 4 Pages.

Kinzel, et al., "Theory of interacting neural networks", In Handbook of Graphs and Networks: From the Genome to the Internet, Apr. 2, 2002, pp. 199-217.

Ko, et al., "A study on data augmentation of reverberant speech for robust speech recognition", In Proceedings of IEEE International Conference on Acoustics, Speech and Signal Processing, Mar. 5, 2017, 5 Pages.

Lei, et al., "Accurate and Compact Large Vocabulary Speech Recognition on Mobile Devices", In Proceedings of 14th Annual Conference of the International Speech Communication Association, vol. 1, Aug. 25, 2013, 4 Pages.

Lei, et al., "Unsupervised Domain Adaptation with Multiple Acoustic Models", In Proceedings of IEEE Spoken Language Technology Workshop, Dec. 12, 2010, 6 Pages.

Li, et al., "Learning small-size DNN with output-distribution-based criteria", In Proceedings of International Speech Communication Association, Sep. 14, 2014, 5 Pages.

Liao, et al., "Large vocabulary automatic speech recognition for children", In Proceedings of 16th Annual Conference of the International Speech Communication Association, Sep. 6, 2015, 5 Pages.

Liao, Hank, "Speaker Adaptation of Context Dependent Deep Neural Networks", In Proceedings of the IEEE International Conference on Acoustics, Speech and Signal Processing, May 26, 2013, 5 Pages.

(56) References Cited

OTHER PUBLICATIONS

Lippmann, et al., "Multi-Style Training for Robust Isolated-Word Speech Recognition", In IEEE International Conference on Acoustics, Speech, and Signal Processing, ICASSP '87, Apr. 6, 1987, 4 Pages.

Lu, et al., "Knowledge distillation for small-footprint highway networks", In Journal of Computing Research Repository, 2016, 5 Pages.

Maas, et al., "Increasing Deep Neural Network Acoustic Model Size for Large Vocabulary Continuous Speech Recognition", In Proceedings of the Computing Research Repository, Jun. 30, 2014, 5 Pages.

Maas, et al., "Recurrent Neural Networks for Noise Reduction in Robust ASR", In Proceedings of 13th Annual Conference of the International Speech Communication Association., Sep. 9, 2012, 4 Pages.

Markov, "Robust Speech Recognition using Generalized Distillation Framework", In Proceedings of 17th Annual Conference of the International Speech Communication Association, Sep. 8, 2016, 5 Pages.

Marxer, et al., "The third chime speech separation and recognition challenge: Dataset, task and baselines", In Proceedings of IEEE Workshop on Automatic Speech Recognition and Understanding, Dec. 2015, 10 Pages.

Mclaren, "Improving Robustness to Compressed Speech in Speaker Recognition", In Proceedings of 14th Annual Conference of the International Speech Communication Association, Aug. 25, 2013, 5 Pages.

Miao, et al., "Simplifying long short-term memory acoustic models for fast training and decoding", In Proceedings of IEEE International Conference on Acoustics, Speech and Signal Processing, Mar. 20, 2016, 5 Pages.

Narayanan, et al., "Ideal Ratio Mask Estimation Using Deep Neural Networks for Robust Speech Recognition", In Proceedings of International Conference on Acoustics, Speech and Signal Processing (ICASSP), 2013, May 26, 2013, 5 Pages.

"International Search Report & Written Opinion Issued in PCT Application No. PCT/CN2014/086397", dated May 27, 2015, 11 Pages.

"International Preliminary Report on Patentability Issued in PCT Application No. PCT/US2014/013469", dated Jul. 20, 2015, 6 Pages.

"International Search Report and Written Opinion Issued in PCT Application No. PCT/US2018/038646", dated Aug. 24, 2018, 13 Pages.

Price, et al., "Wise teachers train better DNN acoustic models", In EURASIP Journal on Audio, Speech, and Music Processing, Apr. 12, 2016, 19 Pages.

Qian, et al., "A frame mapping based Hmm approach to cross-lingual voice transformation", In Proceedings of IEEE International Conference on Acoustics, Speech and Signal Processing, May 22, 2011, 4 Pages.

"Second Office Action Issued in Chinese Patent Application No. 201480068343.X", dated Apr. 10, 2019, 11 Pages.

"Final Office Action Issued in U.S. Appl. No. 15/675,249", dated Feb. 25, 2019, 20 Pages.

Non-Final Office Action Issued in U.S. Appl. No. 15/675,249:, dated Sep. 4, 2019, 14 Pages.

"Office Action Issued in European Patent Application No. 16742099. 1", dated May 21, 2019, 07 Pages.

"Final Office Action Issued in U.S. Appl. No. 15/675,249", dated Feb. 18, 2020, 17 Pages.

"Summons to Attend Oral Proceedings Issued in European Patent Application No. 16742099.1", Mailed Date: Aug. 27, 2020, 8 Pages.

"Office Action and Search Report Issued in Chinese Patent Application No. 201680039897.6", dated Sep. 28, 2020, 28 Pages.

Ruder, et al., "Knowledge Adaptation: Teaching to Adapt", In Journal of Computing Research Repository, Feb. 7, 2017, 11 Pages.

Rumelhart, et al., "Learning representations by back-propagating errors", In Journal of Nature, vol. 323, Oct. 9, 1986, pp. 533-536.

Sainath, et al., "Low-Rank Matrix Factorization for Deep Neural Network Training with High-Dimensional Output Targets", In Proceedings of the IEEE International Conference on Acoustics, Speech and Signal Processing, May 26, 2013, pp. 6655-6659.

Sainath, et al., "Making Deep Belief Networks Effective for Large Vocabulary Continuous Speech Recognition", In Proceedings of the IEEE Workshop on Automatic Speech Recognition and Understanding, Dec. 11, 2011, pp. 30-35.

Sak, et al., "Fast and accurate recurrent neural network acoustic models for speech recognition", In Proceedings of 16th Annual Conference of the International Speech Communication Association, Sep. 6, 2015, 5 Pages.

Sak, et al., "Long short-term memory recurrent neural network architectures for large scale acoustic modeing", In Proceedings of Fifteenth Annual Conference of the International Speech Communication Association, Sep. 14, 2014, 5 Pages.

Schwenk, et al., "Boosting Neural Networks", In Proceedings of Neural Computation, vol. 12, Issue 8, Aug. 2000, pp. 1869-1887.

Seide, et al., "Conversational Speech Transcription Using Context-Dependent Deep Neural Networks", In Proceedings of Interspeech, Aug. 2011, pp. 437-440.

Seide, et al., "Feature Engineering in Context-Dependent Deep Neural Networks for Conversational SpeechTranscription", In the Proceedings of IEEE Workshop on Automatic Speech Recognition and Understanding (ASRU), Dec. 11, 2011, pp. 24-29.

Su, et al., "Error Back Propagation for Sequence Training of Context-Dependent Deep Networks for Conversational Speech Transcription", In Proceedings of the IEEE International Conference on Acoustics, Speech and Signal Processing, May 26, 2013, pp. 6664-6668.

Vanhoucke, et al., "Improving the Speed of Neural Networks on CPUs", In Proceedings of the NIPS Workshop on Jeep Learning and Unsupervised Feature Learning, vol. 1, Dec. 16, 2011, 8 Pages.

Vanhoucke, et al., "Multiframe Deep Neural Networks for Acoustic Modeling", In Proceedings of IEEE International conference on Acoustics, Speech and Signal Processing (ICASSP), May 26, 2013, 4 Pages.

Vincent, et al., "An analysis of environment, microphone and data simulation mismatches in robust speech recognition", In Journal of Computer Speech & Language, Dec. 2, 2016, 37 Pages.

Vu, et al., "Multilingual Deep Neural Network Based Acoustic Modeling for Rapid Language Adaptation", In Proceedings of IEEE International Conference on Acoustics, Speech and Signal Processing (ICASSP), May 4, 2014, 5 Pages.

Wang, et al., "On training targets for supervised speech separation", In Journal of IEEE/ACM Transactions on Audio, Speech, and Language Processing, vol. 22, Issue 12, Dec. 2014, 10 Pages.

Watanabe, et al., "Student-teacher network learning with enhanced features", In Proceedings of IEEE International Conference on Acoustics, Speech and Signal Processing, Mar. 5, 2017, 5 Pages.

Weninger, et al., "Single-channel speech separation with memory-enhanced recurrent neural networks", In Proceedings of IEEE International Conference on Acoustics, Speech and Signal Processing, May 4, 2014, 5 Pages.

Xue, et al., "Restructuring of Deep Neural Network Acoustic Models with Singular Value Decomposition", In Proceedings of the 14th Annual Conference of the International Speech Communication Association, Aug. 25, 2013, pp. 2365-2369.

Xue, et al., "Singular value decomposition based low-footprint speaker adaptation and personalization for deep neural network", In Proceedings of the IEEE International Conference on Acoustics, Speech and Signal Processing, May 4, 2014, 5 Pages.

Young, et al., "Tree-based State Tying for High Accuracy Acoustic Modelling", In Proceedings of the workshop on Human Language Technology, Mar. 8, 1994, pp. 307-312.

Yu, et al., "KL-Divergence Regularized Deep Neural Network Adaptation for Improved Large Vocabulary Speech Recognition", In Proceedings of the IEEE International Conference on Acoustics Speech and Signal Processing, May 26, 2013, pp. 7893-7897.

Yu, et al., "Roles of pre-training and fine-tuning in context-dependent DBN-HMMs for real-world speech recognition", In

(56) References Cited

OTHER PUBLICATIONS

Proceedings of NIPS 2010 Workshop on Deep Learning and Unsupervised Feature Learning, Dec. 1, 2010, 8 Pages.

* cited by examiner

TRANSFER LEARNING TECHNIQUES FOR DISPARATE LABEL SETS

BACKGROUND

Natural language understanding (NLU) is the ability of a computer program to understand human speech and to extract the meaning of spoken or typed input. NLU systems have been used in conjunction with a variety of domains (e.g., places, weather, communication, reminders). Typically, the NLU in these domains is based on statistical machine learned models which require a significant amount of domain-specific annotated training data. For such reasons, building a new domain requires a substantial resource investment. Although various technologies and approaches in domain adaptation have evolved to address these concerns, these solutions assume the use of invariant label spaces. As a result, a straightforward application of these solutions is not currently possible.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods of transfer learning techniques for disparate label sets. In aspects, a data set may be accessed on a server device. The data set may comprise labels and word sets associated with the labels. The server device may induce label embedding within the data set. The embedded labels may be represented by multi-dimensional vectors that correspond to particular labels. The vectors may be used to construct label mappings for the data set. The label mappings may be used to train a model to perform domain adaptation or transfer learning techniques. The model may be used to provide results to a statement/query or to train a different model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
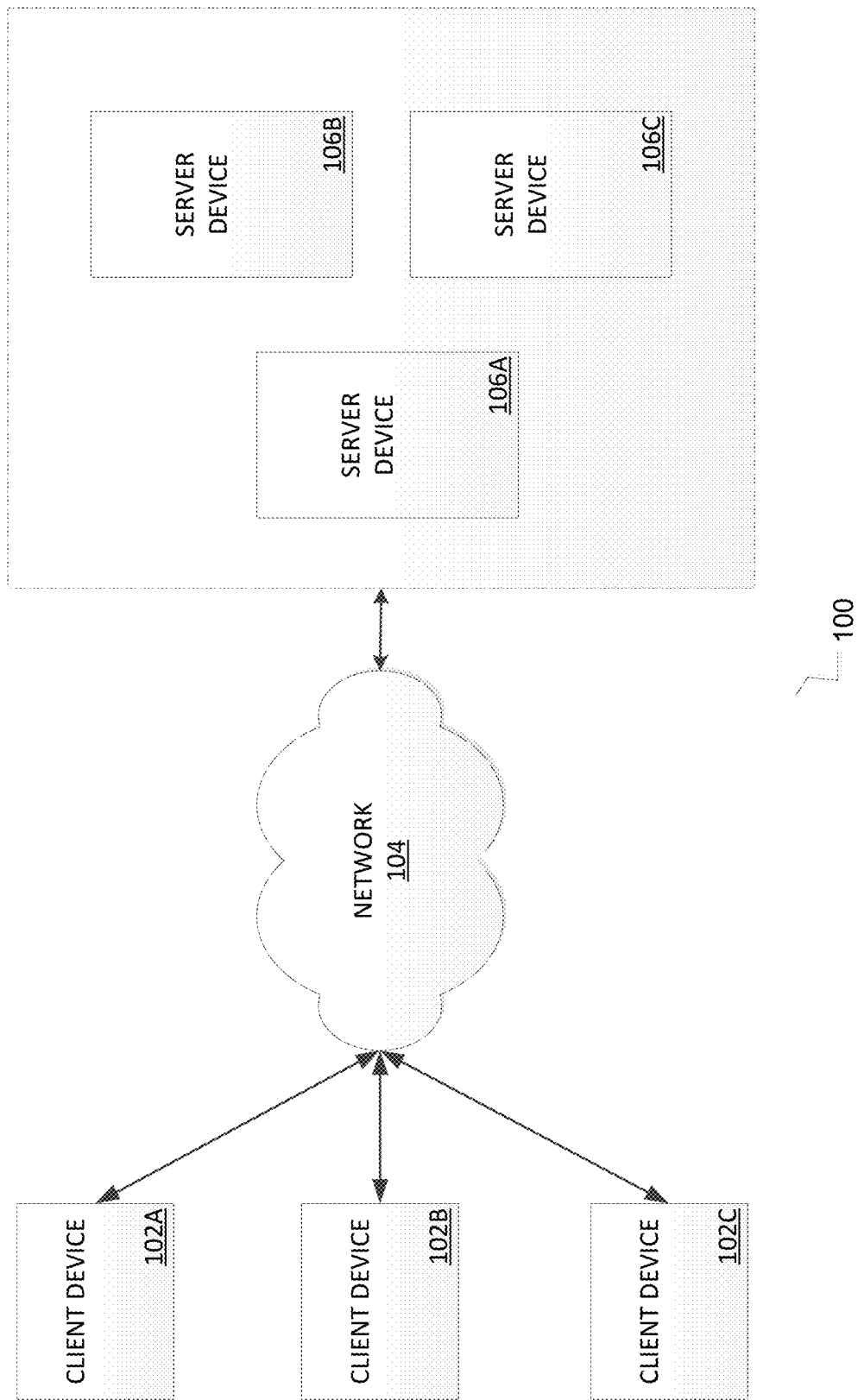
FIG. 1 illustrates an overview of an example system for implementing transfer learning techniques for disparate label sets as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods of transfer learning techniques for disparate label sets. Transfer learning, as used herein, may refer to the application of knowledge ascertained while solving a first problem to a different, but related, second problem. In examples, a processing device may use generated label mappings to train a model such as a language model. The trained model may perform domain adaptation or exemplary transfer learning techniques described herein to significantly decrease the amount of resources that must be invested into creating annotations specific to new applications or domains.

In examples, a data set may be accessed on a server device. One skilled in the art will recognize that any type of processing device may be utilized with examples of the present disclosure. An example data set may comprise data for a natural language understanding (NLU) system. However, one skilled in the art will recognize that examples of the present disclosure may be applied to any input understanding processing including input that is processed in a form such as voice/utterance, text, handwritten input, and touch, among other examples. In one example, an NLU, as used herein, may refer to the ability of a computer program to understand human speech and to facilitate the extraction of the meaning of spoken, typed and/or otherwise received input. The NLU data may be associated with one or more domains and may comprise labels and word sets that are associated with the labels. A domain, as used herein, may refer to a container and/or a boundary that isolates or defines an application, software functionality, or a set of data. For example, an "events" domain may be used to search and purchase event-related items; whereas a "places" domain may be used to search for places and directions to the places.

The processing device (e.g., server device) may derive dense, low-dimensional representations of the data within the data set using, for example, canonical correlation analysis (CCA). CCA, as used herein, may refer to a statistical technique that describes a method of determining relationships between a plurality of multidimensional sets of variables (vectors) that are measured on the same entity. The determined relationships may indicate which of the variables are maximally correlated. A dense, low-dimensional representation may include information from a maximally correlated variables. In some aspects, CCA may be used to induce label embedding within the data set. The embedded labels may be represented by multi-dimensional vectors that correspond to particular labels and the words associated with the labels. The vectors may be used to construct label mappings for the data set. In some examples, the labels within the vectors may be grouped and mapped to a coarse label set (cluster). A course label set, as used herein, may refer to a set of labels that has been abstracted or generalized from a more refined label set. For instance, the coarse label "time" may be abstracted from the fine labels "start_time" and "end_time." In other examples, the labels within the vectors may be used to bijectively map labels within a disparate data set. For instance, the label "duration" in the domain "events" may be mapped to the label "travel_time" in the domain "places."

A processing device may use the label mappings to train a model to perform domain adaptation or transfer learning techniques. Training a model, as used herein, may refer to using a set of training data to fit a statistical machine learned model that can be used to predict a response value from one or more predictors. Domain adaptation, as used herein, may refer to mapping the data, label sets and schemas of different domains and/or applications into the same semantic space. In some examples, the model may be trained to perform coarse-to-fine label prediction using the label mappings. For instance, the model may be trained on the source domain and predicted labels may be used to train a model on the target domain. In other examples, the model may be trained using the union of the source domain data and the target domain data such that the data from each domain is conjoined with a domain indicator. One skilled in the art will recognize that examples described in the present disclosure can be applicable to any application domains or services.

Accordingly, the present disclosure provides a plurality of technical benefits including but not limited to: improved training of language models, reduction in error rate in input processing, improved mapping of label sets for different domains, data-driven techniques to construct mappings between label sets in different domains; data-driven techniques to find shared labels across domains; reducing training data, time and resource cost required to annotate a domain; increasing third party extensibility; and improved efficiency and quality for applications/services utilizing examples of the present disclosure, among other examples.

FIG. 1 illustrates an overview of an example system for implementing transfer learning techniques for disparate label sets as described herein. Exemplary system 100 presented is a combination of interdependent components that interact to form an integrated whole for improving recommendations from implicit feedback. Components of the systems may be hardware components or software implemented on and/or executed by hardware components of the systems. In examples, system 100 may include any of hardware components (e.g., used to execute/run operating system (OS)), and software components (e.g., applications, application programming interfaces, modules, virtual machines, runtime libraries, etc.) running on hardware. In one example, an exemplary system 100 may provide an environment for software components to run, obey constraints set for operating, and makes use of resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. As an example of a processing device operating environment, refer to the exemplary operating environments depicted in FIGS. 5-7. In other examples, the components of systems disclosed herein may be spread across multiple devices. For instance, input may be entered on a client device (e.g., processing device) and information may be processed or accessed from other devices in a network such as one or more server devices.

As one example, the system 100 comprises client device 102A, client device 102B, client device 102C, distributed network 104, and a distributed server environment comprising one or more servers such as server device 106A, server device 106B and server device 106C. One of skill in the art will appreciate that the scale of systems such as system 100 may vary and may include more or fewer components than those described in FIG. 1. In some examples, interfacing between components of the system 100 may occur remotely, for example where components of system 100 may be spread across one or more devices of a distributed network.

The client computing devices 102A, for example, may be configured to receive input associated with a statement or query via a user interface component or other input means. Examples of input may include voice, visual, touch and text input. Client computing device 102A may further be configured to process, store and/or transmit the received input to one or more of servers 106A, 106B and 106C via network 104. Server computing device 106A, for example, may be configured to receive, process and store the input. In aspects, processing the input may comprise identifying one or more domains, labels and word sets within the input and identifying associations between the domains, labels and word sets. The identified domains, labels and word sets and/or their associations may be stored within a data store. Server computing device 106A may also be configured to transform the input within the data store into vector representations. The vector representations may be used to construct label mappings for the input. Examples of label mappings techniques include coarse label set mappings and bijective label set mapping, among other examples. Domain adaptation techniques may be used with the label mappings for disparate sets of data. Examples of domain adaptation techniques include coarse-to-fine prediction and feature duplication, among other examples. Server computing device 106A may provide access to the disparate sets of data.

Figure 2:
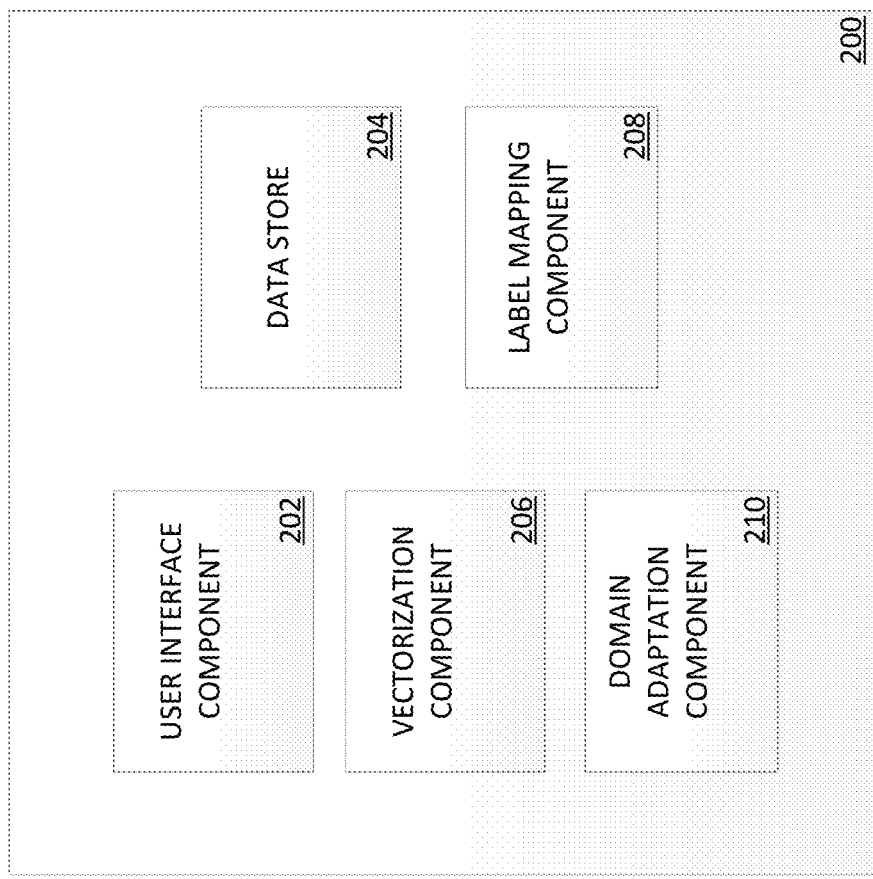
FIG. 2 illustrates an overview of an example input processing unit for implementing transfer learning techniques for disparate label sets as described herein.

FIG. 2 illustrates an overview of an example input processing unit 200 for implementing transfer learning techniques for disparate label sets as described herein. The learning techniques implemented by input processing unit 200 may comprise the learning techniques and input described in FIG. 1. In alternative examples, a single system (comprising one or more components such as processor and/or memory) may perform processing described in systems 100 and 200, respectively. Further, input processing unit 200 may comprise a user interface component as described in the description of FIG. 1.

Exemplary input processing unit 200 may comprise user interface (UI) component 202, data store 204, vectorization component 206, label mapping component 208 and domain adaptation component 210, each having one or more additional components. The UI component 202 may be configured to receive query data from a client device. In a particular example, UI component 202 may be configured to receive query data directly from a user. The query data may be associated with one or more domains and/or one or schemas may be used to annotate data within the domain. A schema, as used herein, may refer to framework for specifying the label type or name for a one or more portions of the data. The query data may comprise a query, a statement, a string of words, one or more labels, and/or data associated with one or more intents and/or slots. An intent, as used herein, may refer to the goal or intention of user's utterance or other entered input. A slot, as used herein, may refer to the actionable content within the user's utterance or other entered input. The UI component 202 may be further configured to process the received query data. For example, UI component 202 may parse query data into one or more domains, labels and/or word sets. Associations within the domains, labels and/or word sets may be identified and/or established such that a plurality of word sets may be associated with a label, and a plurality of labels may be associated with a domain. UI component 202 may transmit the processed query data to data store 204.

The data store 204 may be configured to receive, store and provide access to various types of data. In aspects, data store 204 may provide storage for data associated with the received query data. The data within the data store may be organized and stored according to criteria, such as domain. In some examples, a storage management service may be running on the input processing unit 200. The storage management service may work in conjunction with data store 204 to facilitate the access to data within data store 204. The storage management service and the data store may be located on input processing unit 200. Alternately, one or more of the storage management service and the data store 204 may be located on a separate computing device that is accessible by input processing unit 200.

The vectorization component 206 may be configured to transform the query data within data store 204 into low-dimensional vector representations. In aspects, vectorization component 206 may access labels within the query data in order to transform one or more labels or label types and associated data into corresponding vector representations (label embedding). Vectorization component 206 may use an algorithm, such as a CCA algorithm, to perform the transformations. For example, the following exemplary algorithm may be used:

| CCA-Label |
|---|
| Input: labeled sequences $\{(x^{(i)}, y^{(i)})\}_{i=1}^{n}$, dimension k<br>Output: label vector $v \in \mathbb{R}^k$ for each label type<br>  1. For each label type $l \in \{1 ...d\}$ and word type $w \in \{1 ...d'\}$ present in the sequences, calculate<br>     • count(l) = number of times label l occurs<br>     • count(w) = number of times word w occurs<br>     • count(l,w) = number of times word w occurs under label l<br>  2. Define a matrix $\Omega \in \mathbb{R}^{d \times d'}$ where:<br>$$\Omega_{l,w} = \frac{count(l,w)}{\sqrt{count(l)count(w)}}$$ |

| CCA-Label |
|---|
| 3. Perform rank-k SVD on $\Omega$. Let $\mathcal{U} \in \mathbb{R}^{d \times k}$ be a matrix where the i-th column is the left singular vector of $\Omega$ corresponding to the i-th largest singular value,<br>4. For each label l, set the l-th normalized row of $\mathcal{U}$ to be its vector representation, | where n is the number of instances of labels in the entire data set, $x_1 \ldots x_n$ is the original representation of the labels, $y_1 \ldots y_n$ is the original representation of the word sets associated with the labels, d is the number of distinct labels, d' is the number of distinct word, $x_l \in \mathbb{R}^d$ is a zero vector in which the entry corresponding to the label of the l-th instance is set to 1, and $y_l \in \mathbb{R}^{d'}$ is a zero vector in which the entries corresponding to words spanned by the label are set to 1.

The label mapping component 208 may be configured to construct label mappings using the vector representations. In some aspects, label mapping component 208 may use the vector representations to map the labels within the vector representations to a coarse label set. For example, given a domain and the labels that occur in that domain, label mapping component 208 may reduce the number of labels by clustering the vector representations. The clusters may represent abstracted or generalized labels and may be generated using calculations or algorithms, such as the k-means clustering, spectral clustering, affinity propagation, mean-shift, Ward hierarchical clustering, agglomerative clustering, DBSCAN, Gaussian mixtures, and Birch clustering. In examples, k-means clustering, as used herein, may refer to an operation of vector quantization that is used in cluster analysis to partition n observations into k clusters in which each observation belongs to the cluster with the nearest mean.

In other aspects, label mapping component 208 may use the vector representations to map the labels within the vector representations to a disparate data set. For example, given a pair of domains and the labels that occur in each domain respectively, label mapping component 208 may create a bijective label mapping between the labels within the pair of domains. Bijective mapping, as used herein, may refer to a function between the elements of a plurality of sets, where each element of a particular set is paired with an element of another particular set. The bijective label mapping may be such that labels are mapped to a "nearest neighbor" and may be generated using calculations or algorithms such as the k-nearest neighbors algorithm. In examples, k-nearest neighbors, as used herein, may refer to a non-parametric method of classification that is used to assign an object to the class most common among its k nearest neighbors.

The domain adaptation component 210 may be configured to apply domain adaptation techniques using label mappings. In some aspects, domain adaptation component 210 may use coarse-to-fine predictive analysis to adapt data within a source domain to a target domain. Coarse-to-fine prediction, as used herein, may refer to transforming a group of objects/observations into a larger related group of objects/observations. For example, domain adaptation component 210 may comprise or have access to a statistical data model. Domain adaptation component 210 may train the model (or cause the model to be trained) using label mappings associated with a source domain. The model may then be used to make predictions on labels within a target domain. The predictions may comprise label correlations derived during label mapping, data regarding synonymous label names and/or types, historical mapping data, intent/slot analysis, among others. The predicted labels may be provided to the model as additional training features/content and used to train the model on the source domain. Alternately, the predicted labels may be provided to a separate model that is trained on the target domain.

In other aspects, domain adaptation component 210 may use feature duplication techniques to adapt data within a source domain to a target domain. Feature duplication, as used herein, may refer to the duplication of vector representations, intent/slot pairs, or other data associated with a data set. For example, domain adaptation component 210 may duplicate each vector within a data set comprising at least a source domain and a target domain. The duplicated vector may be conjoined with a domain indicator that specifies the domain with which the vector is associated. Domain adaptation component 210 may then train a statistical data model (or cause the model to be trained) on the target domain using the union of the duplicated source data and the duplicated target data. In aspects, the model trained on the target domain may be used to provide results to statements and/or queries on the target domain or to train a different model to use the same (or a similar) semantic space.

Figure 3:
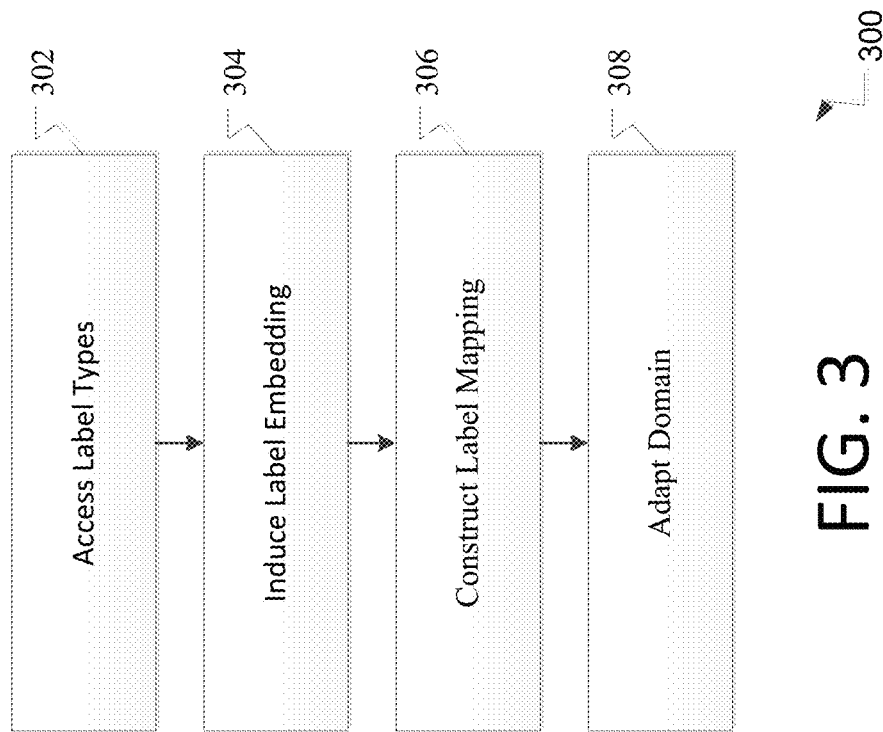
FIG. 3 illustrates an example method of transfer learning techniques for disparate label sets as described herein.
Figure 4:
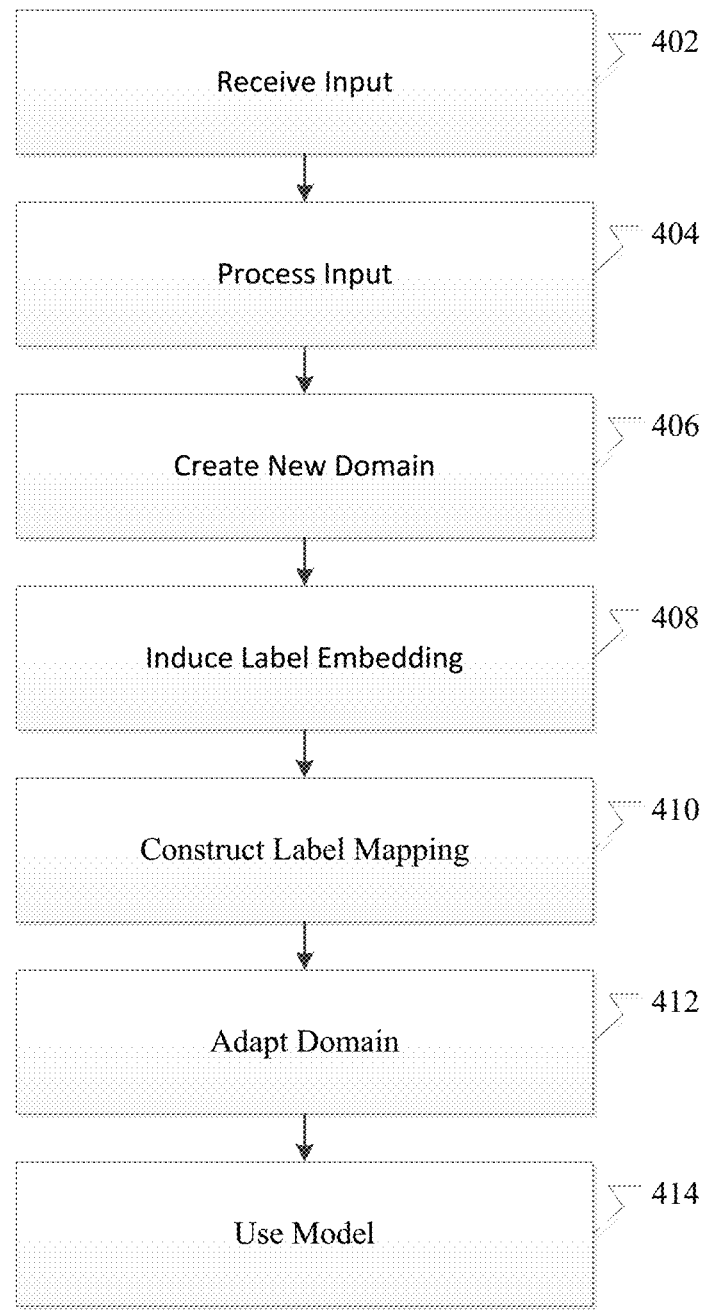
FIG. 4 illustrates an example method of performing transfer learning techniques for disparate label sets using received input as described herein.

FIG. 3-4 illustrate various process flows associated with transfer learning techniques for disparate label sets as described herein. In aspects, methods 300-400 may be executed by an exemplary system such as system 100 of FIG. 1. In examples, methods 300-400 may be executed on a device comprising at least one processor configured to store and execute operations, programs or instructions. However, methods 300-400 are not limited to such examples. In other examples, methods 300-400 may be performed on an application or service for providing recommendations. In at least one example, methods 300-400 may be executed (e.g., computer-implemented operations) by one or more components of a distributed network, for instance, web service/distributed network service (e.g. cloud service) to leverage transfer learning techniques for disparate label sets.

FIG. 3 illustrates an example method 300 of transfer learning techniques for disparate label sets as described herein. Exemplary method 300 begins at operation 302 where a data set may be accessed by an input processing unit. In aspects, the data set may be in a data store located within the input processing unit or located on a separate computing device that is accessible by input processing unit. The data set may be accessible via a user interface or application programming interface (API) on the processing unit or on a separate computing device. The data set may comprise annotated data from one or more applications and/or domains. Each of the one or more domains may be associated with a respective schema. A schema may facilitate the annotation of a data set by specifying the intent, slots and/or other information within a received query/statement. Labels may be applied to the intent, slots and/or other information. In some aspects, a domain schema may specify information that is similar or the same as another domain schema. However, the meaning of the words in the received input may be different in each domain. For example, the word "sunny" may be a weather condition in a weather domain, but may be a song title in a weather domain. The data within the data set may be associated according to domain such that a plurality of slots may be associated with an intent, and a plurality of intents may be associated with a domain.

At operation 304, the data within the data set may be transformed into low-dimensional vector representations. In aspects, CCA may be used to transform labels or label types within the data set into corresponding vector representations of the data, as described above in FIG. 2. Generally, the motivation for using CCA and the resulting definitions (e.g., $x_l \in \mathbb{R}^d$ is a zero vector in which the entry corresponding to the label of the l-th instance is set to 1, and $y_l \in \mathbb{R}^{d_l}$ is a zero vector in which the entries corresponding to words spanned by the label are set to 1) is that similar labels and label types may be associated with the same (or similar) words. For example, a domain may comprise the label "start-time" (designating the start time of a calendar event) and "end-time" (designating the end time of a calendar event). Both labels are frequently associated with phrases about time. The phrases "9 pm," "7," and "8 am" may be labeled as "start-time," and the phrases "9 am" and "7 pm" may be labeled as "end-time." In such examples, both labels share the words "am," "pm," "9," and "7." Accordingly, CCA may be used to transform each label into a k-dimensional vector (vector representation) corresponding to the CCA projection of the encoding of the respective label. In some aspects, using the CCA algorithm may produce an indication that the k-dimensional vectors are closely associated.

At operation 306, the vector representations may be used to construct label mappings to disparate label sets. In some aspects, the vector representations may be used to map a coarse label set. A coarse label set may be created using k-means clustering (described above) to group (cluster) vector representations that are closely associated into abstracted or generalized labels. For example, a domain may comprise a vector for a "start-time" label and a vector for an "end-time" label. The "start-time" and "end-time" vectors may be identified as commonalities (closely related) and/or may comprise an indicator of the commonalities. Because of the commonalities, at least in part, the "start-time" and "end-time" vectors may be group into a single label, such as "Time." Additional examples of clustering are illustrated in the below table:

| Cluster | Labels | Cluster | Labels |
| --- | --- | --- | --- |
| Time | start_time | Person | contact_info |
|  | end_time |  | artist |
|  | original_start_time |  | from_contact_name |
|  | travel_time |  | relationship_name |
| Loc | absolute_loc | Loc_ATTR | prefer_route |
|  | leaving_loc |  | public_trans_route |
|  | from_loc |  | nearby |
|  | position_ref |  | distance |

Figure 8:
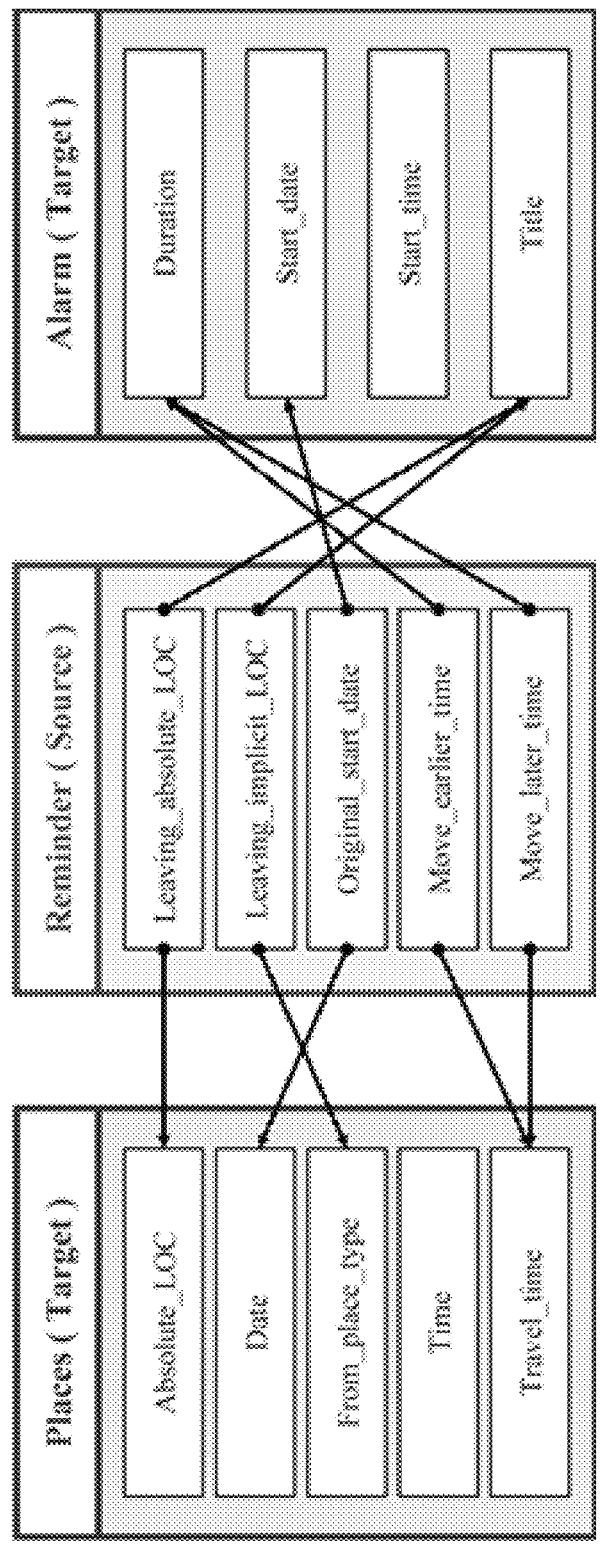
FIG. 8 is an exemplary diagram of bijective mapping in exemplary domains.

In other aspects, the vector representations may be used to perform bijective mapping. Bijective mapping may be performed using k-nearest neighbors algorithm on the label sets of one or more domains to determine the nearest neighbor of each label. For example, a "Reminder" domain may comprise a "move-earlier-time" label, an "Alarm" domain may comprise a "duration" label, and a "Places" domain may comprise a "travel-time" label. The vectors representing the three labels may be identified as sharing commonalities and/or may comprise an indicator of the commonalities. The query "move the dentist's appointment up by 30 minutes" may be received in the Reminder domain. The label move-earlier-time may be assigned to the phrase "30 minutes." Because of the commonalities, at least in part, the "move-earlier-time" label may be mapped to the "duration" and "travel-time" labels instead of the more (facially) semantically-aligned labels "time" in the "Places" domain and "start-date" in the "Alarms" domain. This particular example of bijective mapping in the above exemplary domains (e.g., Places, Reminder, and Target) is illustrated in FIG. 8.

At operation 308, domain adaptation techniques may be used to implement annotations in domains with different labels. In some aspects, coarse-to-fine predictive analysis may be used in conjunction with the label mappings to adapt data within a source domain to a target domain. For example, a data set may comprise data from a source domain and a target domain. A statistical data model may be trained using label mappings associated with the source domain. In one particular example, a model may be trained using a coarse or clustered label set from a source domain. In such an example, the model may determine a correlation between fine label names and a coarse label names or between word sets and fine and/or coarse label names. This correlation may allow the model to predict correlations between the coarse or clustered label set and the labels from the target domain, or to predict labels within the target domain. The predicted correlations and/or labels may be used to retrain the model on the target domain or to train a second model on the target domain. In some aspects, the second model may be used to predict fine labels for the target domain, such as "start-time" and "end-time," or may be used to train a third model.

In other aspects, feature duplication may be used in conjunction with the label mappings to adapt data within a source domain to a target domain. For example, a data set may comprise data from a source domain and a target domain. The labels, the data associated with the labels, and/or vector representations within the data set may be duplicated. The duplicated data may be conjoined with a domain indicator. In a particular example, a data set may comprise a "Weather" domain and a "Music" domain, both of which comprise a "sunny" label. In the "Weather" domain, "sunny" may be a weather condition, whereas "sunny" may be a song title in the "Music" domain. Using feature duplication, the label designators/features w(0) =sunny and (w(0)=sunny)^(domain=Weather) may be generated for the "Weather" domain, and the label designators/features w(1)=sunny and (w(1)=sunny)^(domain=Music) may be generated for the "Music" domain.

A statistical data model may then be trained using the feature-duplicated data set, which comprises a union of the source domain data and the target domain data. The trained model may then be used to provide results to statements and/or queries on the source and/or target domains. In aspects, the duplication and conjoining preprocessing steps provide the model with access to all of the data within the data set through common label designators/features. The common label designators/features may be useful when there is label ambiguity in the data set (e.g., "sunny" label in multiple domains). In such aspects, the preprocessing steps may also provide the model with access to data within specific domains through the domain-specific label designators/features. The domain-specific label designators/features may be useful to avoid excessive data processing and to reduce result times when labels with the data set are unambiguous.

FIG. 4 illustrates an example method 400 of performing transfer learning techniques for disparate label sets using received input as described herein. Exemplary method 400 begins at operation 402 where query input may be received by an input processing unit. The query input may comprise a query, a statement, a string of words, one or more labels, and/or data associated with one or more intents and/or slots.

In aspects, the input processing unit may receive the query input from a user via a user interface component or from a separate input processing unit via an API. For example, the query "I want to see Avengers tonight" may be received by the input processing unit via an API accessed by a client device.

At operation 404, the received query input may be processed and stored. In aspects, the input processing unit may analyze the query input to identify domains, intents, slots, and/or other information associated with the query input. The identified data may be parsed into labels and word sets associated with one or more domains. For example, the query "I want to see Avengers tonight" may be received by a input processing unit comprising a "Movies" domain. The query may be analyzed and the input processing unit may identify the domain "Movies", the intent "Find Movie", and the slots "avengers" and "tonight." The labels "movie-name" and "movie-start-time" may be applied to the slots "avengers" and "tonight", respectively, and the labels may be associated with the identified domain and/or intent. In some aspects, the processed data (movie data set) may be stored in a data store. The data store may be located on the input processing unit or on a remote computing device accessible by the input processing unit.

At operation 406, a new domain and/or application may be created, installed or made accessible to the input processing unit. The new domain may be associated with a statistical data model, but the input processing unit may possess insufficient labeled data to train the data on the new domain. Accordingly, the input processing unit may access the movie data set data within the data store. For example, a new "Calendar" domain may be installed on the input processing unit as part of a calendaring application. The calendar application may comprise no data (e.g., appointments, contacts, etc.) and no "Calendar" domain labels may be assigned.

At operation 408, the data set within the data store may be transformed into low-dimensional vector representations. In aspects, CCA may be used to transform labels or label types within the data set into corresponding vector representations, as described above with respect to FIG. 2. For example, the movie data set may comprise 100 instances of labels/word set pairs of which six labels are unique. The input processing unit may transform the six labels into k-dimensional vector representations corresponding to the CCA projection of the encoding of the respective labels.

At operation 410, the vector representations may be used to construct label mappings to disparate label sets. In some aspects, the vector representations may be used to map a coarse label set. For example, the movie data set may comprise six unique labels: "movie-name," "movie-start-time," "movie-end-time," "movie-location," "movie-distance," and "move-rating." The data within the vector representations of these labels may be such that the vector representations may be mapped to a coarse label set (cluster). In a particular example, "movie-start-time" and "movie-end-time" may be generalized (clustered) to the label "Time," "movie-location" and "movie-distance" may be generalized to the label "Location," and "movie-name" and "move-rating" may generalized to the label "Details."

At operation 412, domain adaptation techniques may be used to implement annotations in domains with different labels. In some aspects, coarse-to-fine predictive analysis may be used in conjunction with the label mappings to adapt data within a source domain to a target domain. For example, the input processing unit may use a coarse label set (e.g., "Time," "Location," and "Details") generated from labels within the "Movies" domain to train a model on the "Movies" domain. The trained model may be used to predict correlations between the coarse label set and the labels from the "Calendar" domain, or to predict labels within the "Calendar" domain. In a particular example, the "Calendar" domain may comprise the labels: "meeting-time," "meeting-duration," "meeting-sponsor," "meeting-location," and "meeting-subject." The model trained on the "Movies" domain may use the coarse label "Time" to determine words synonymous with or relating to time (e.g., "minute," "hour," "duration," "now," "earlier," etc.). The determined words may be used to retrain the model or to train a new model on time-related (e.g., semantically-related) labels in the "Calendar" domain, such that the model recognizes "meeting-time" and "meeting-duration" as time-based labels.

At operation 414, the model trained on the target domain may be used to provide results to a statement or query. In some aspects, the input processing unit may use the trained model to extract the meaning of received queries, retrieve results sets, and/or train a different model on domain or data set. For example, the query "I want to see Avengers tonight" may be received by an input processing unit comprising a "Movies" domain, a "Calendar" domain and a model trained on both domains. After processing the query, the input processing unit may be able to determine that the query implicates both domains. In a particular example, the slot "tonight" may be associated with the label "movie-start-time" in the "Movie" domain and the label "meeting-time" in the "Calendar" domain. The trained model may return movie times and locations for the Avengers movie, but the model may also return a message indicating a time conflict with one or movie times and a scheduled meeting.

Figure 5:
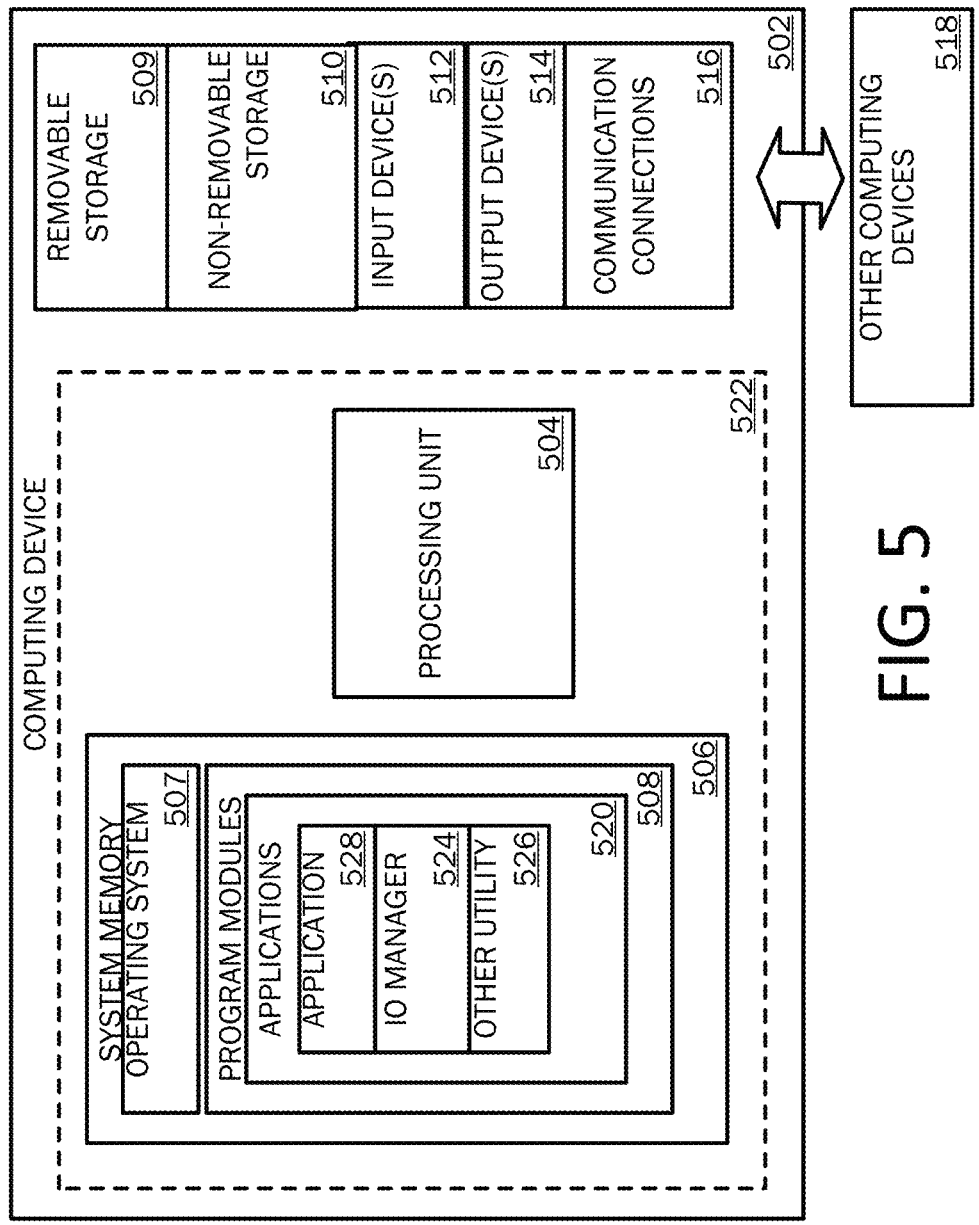
FIG. 5 is a block diagram illustrating an example of a computing device with which aspects of the present disclosure may be practiced.
Figure 6A:
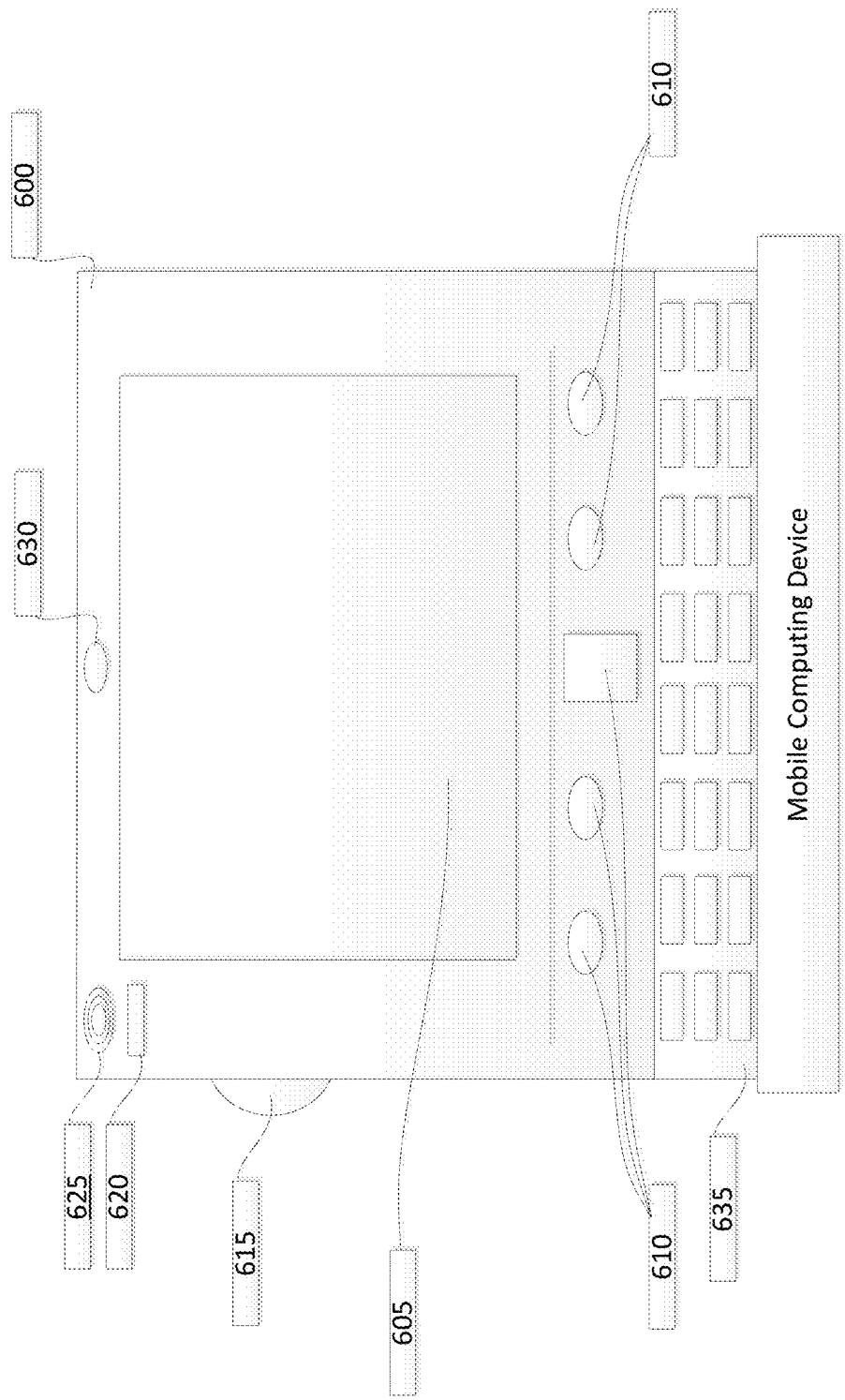
FIGS. 6A and 6B are simplified block diagrams of a mobile computing device with which aspects of the present disclosure may be practiced.
Figure 6B:
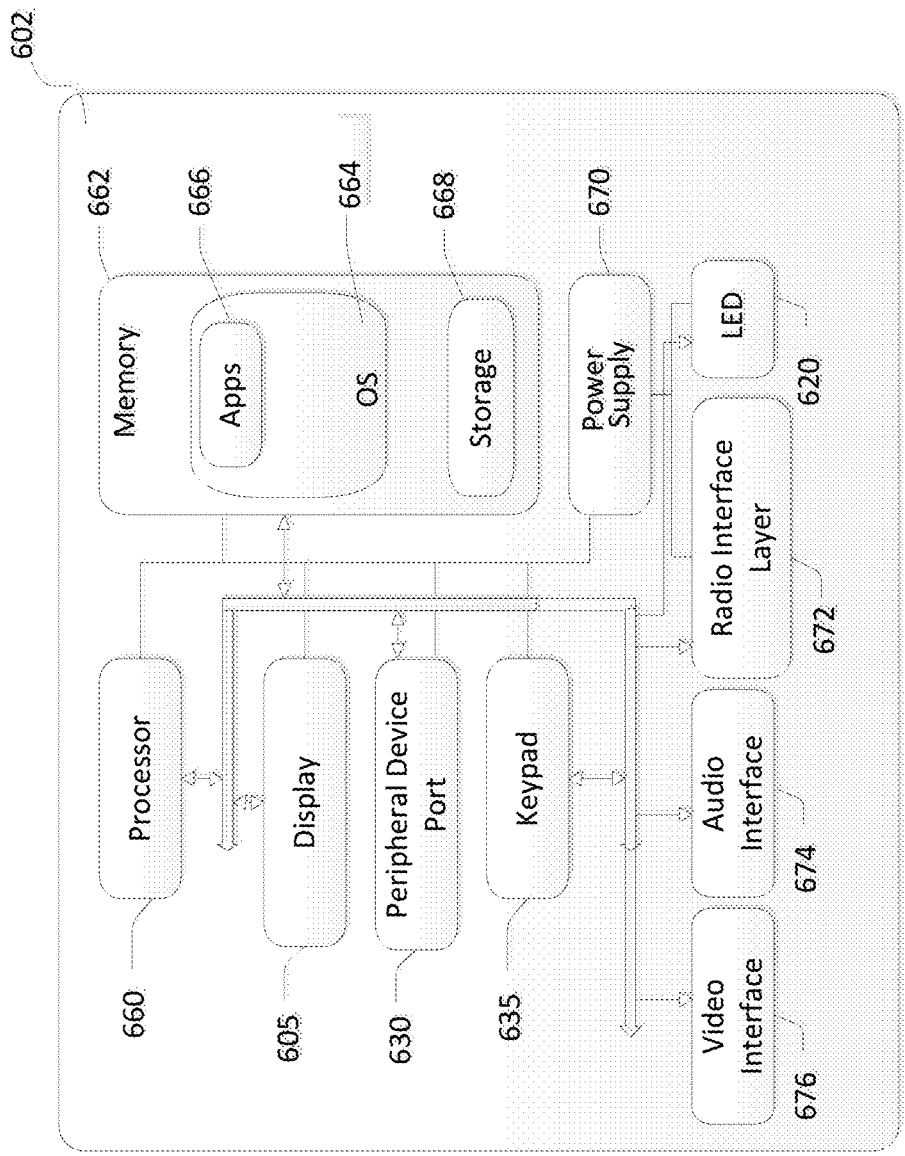
Figure 7:
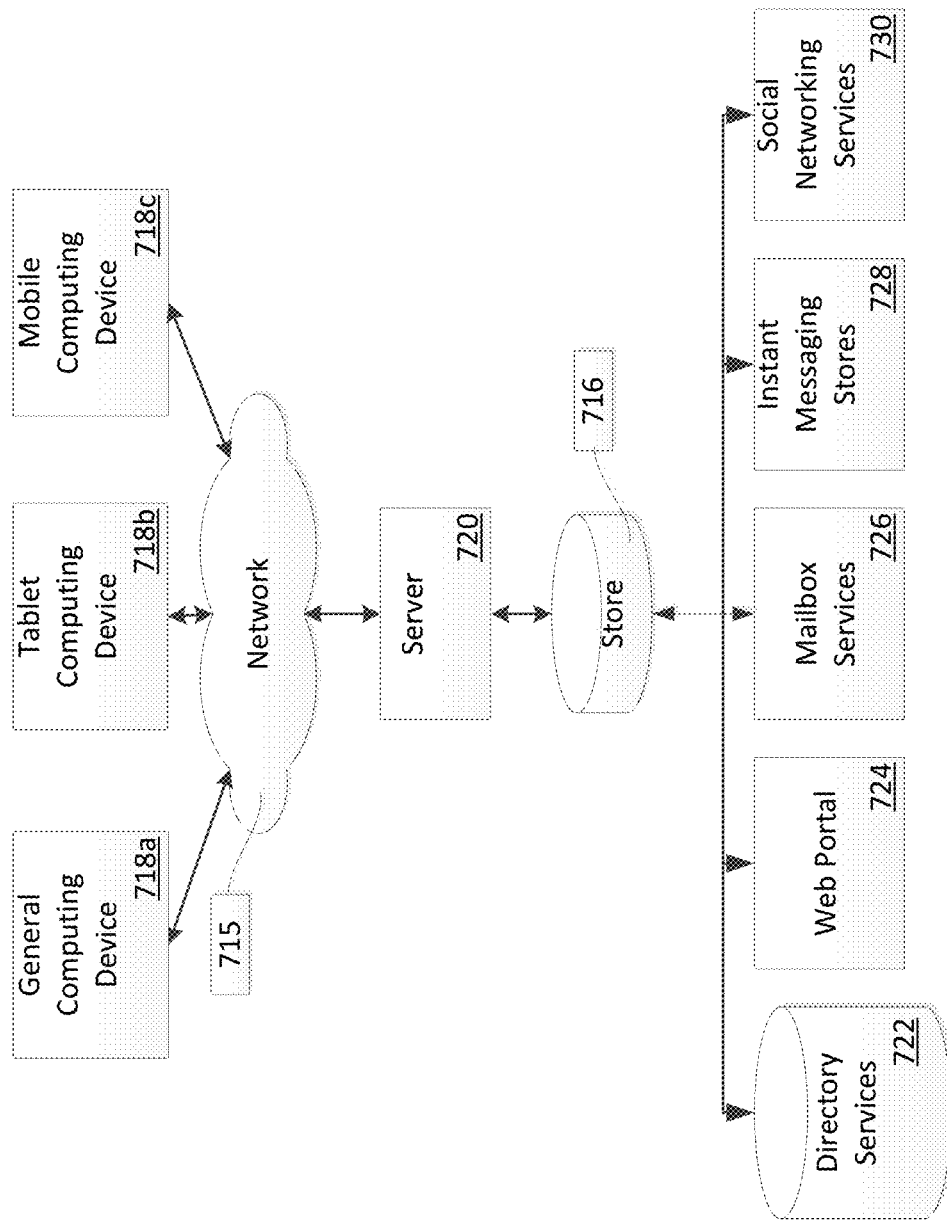
FIG. 7 is a simplified block diagram of a distributed computing system in which aspects of the present disclosure may be practiced.

FIGS. 5-7 and the associated descriptions provide a discussion of a variety of operating environments in which examples of the invention may be practiced. However, the devices and systems illustrated and discussed with respect to FIGS. 5-7 are for purposes of example and illustration and are not limiting of a vast number of computing device configurations that may be utilized for practicing examples of the invention, described herein.

FIG. 5 is a block diagram illustrating physical components of a computing device 502, for example a component of a system with which examples of the present disclosure may be practiced. The computing device components described below may be suitable for the computing devices described above. In a basic configuration, the computing device 502 may include at least one processing unit 504 and a system memory 506. Depending on the configuration and type of computing device, the system memory 506 may comprise, but is not limited to, volatile storage (e.g., random access memory), non-volatile storage (e.g., read-only memory), flash memory, or any combination of such memories. The system memory 506 may include an operating system 507 and one or more program modules 508 suitable for running software applications 520 such as application 528, IO manager 524, and other utility 526. As examples, system memory 506 may store instructions for execution. Other examples of system memory 506 may be components such as a knowledge resource or learned program pool, as examples. The operating system 507, for example, may be suitable for controlling the operation of the computing device 502. Furthermore, examples of the invention may be practiced in conjunction with a graphics library, other operating systems, or any other application program and is not limited to any particular application or system. This basic configuration is illustrated in FIG. 5 by those components within a dashed line 522. The computing device 502 may have additional features or functionality. For example, the computing device 502 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 506. While executing on the processing unit 504, the program modules 508 (e.g., application 528, Input/Output (I/O) manager 524, and other utility 526) may perform processes including, but not limited to, one or more of the stages of the operational method 400 illustrated in FIG. 4, for example. Other program modules that may be used in accordance with examples of the present invention may include electronic mail and contacts applications, word processing applications, spreadsheet applications, database applications, slide presentation applications, input recognition applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 502 may also have one or more input device(s) 512 such as a keyboard, a mouse, a pen, a sound input device, a device for voice input/recognition, a touch input device, etc. The output device(s) 514 such as a display, speakers, a printer, etc. may also be included. The aforementioned devices are examples and others may be used. The computing device 504 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 506, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 502. Any such computer storage media may be part of the computing device 502. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a personal data assistant, a tablet personal computer, a laptop computer, and the like, with which examples of the invention may be practiced. For example, mobile computing device 600 may be implemented as system 100, components of systems 100 may be configured to execute processing methods as described in FIG. 4, among other examples. With reference to FIG. 6A, one example of a mobile computing device 600 for implementing the examples is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In yet another alternative example, the mobile computing device 600 is a portable phone system, such as a cellular phone. The mobile computing device 600 may also include an optional keypad 635. Optional keypad 635 may be a physical keypad or a "soft" keypad generated on the touch screen display. In various examples, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In examples, the system 602 is implemented as a "smart phone" capable of running one or more applications (e.g., browser, e-mail, input processing, calendaring, contact managers, messaging clients, games, and media clients/players). In some examples, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including application 528, IO manager 524, and other utility 526 described herein.

The system 602 has a power supply 670, which may be implemented as one or more batteries. The power supply 670 might further include an external power source, such as an AC adapter or a powered docking cradle that supplements or recharges the batteries.

The system 602 may include peripheral device port 678 that performs the function of facilitating connectivity between system 602 and one or more peripheral devices. Transmissions to and from the peripheral device port 672 are conducted under control of the operating system 664. In other words, communications received by the peripheral device port 678 may be disseminated to the application programs 666 via the operating system 664, and vice versa.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with examples of the present invention, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one example of the architecture of a system for providing an application that reliably accesses target data on a storage system and handles communication failures to one or more client devices, as described above. Target data accessed, interacted with, or edited in association with application 528, IO manager 524, other utility 526, and storage may be stored in different communication channels or other storage types. For example, various documents may be stored using a directory service 722, a web portal 724, a mailbox service 726, an instant messaging store 728, or a social networking site 730, application 528, IO manager 524, other utility 526, and storage systems may use any of these types of systems or the like for enabling data utilization, as described herein. A server 720 may provide storage system for use by a client operating on general computing device 502 and mobile device(s) 600 through network 715. By way of example, network 715 may comprise the Internet or any other type of local or wide area network, and client nodes may be implemented as a computing device 502 embodied in a personal computer, a tablet computing device, and/or by a mobile computing device 600 (e.g., a smart phone). Any of these examples of the client computing device 502 or 600 may obtain content from the store 716.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A system comprising:
   at least one processor; and
   memory coupled to the at least one processor, the memory comprising computer executable instructions that, when executed by the at least one processor, performs a method comprising:
      accessing a first set of labeled data associated with at least a first domain, wherein the first set of labeled data comprises one or more labels and corresponding data values;
      transforming the first set of labeled data into a set of vectors, wherein the set of vectors includes at least a first vector comprising a first label and a second vector comprising a second label;
      using one or more clustering techniques to identify a commonality between the first label and the second label, wherein the commonality indicates the first label and the second label belong to a shared cluster category;
      based at least on the identified commonality between the first label and the second label, generating a coarse label set comprising a third label representing the shared cluster category, wherein the third label represents an abstraction of the first label and the second label;
      using the coarse label set, training a model for a second domain to perform transfer learning techniques associated with natural language understanding, wherein the transfer learning techniques comprise adapting data in the first domain to the second domain and training the model using a union of data from the first domain and the second domain, wherein the second domain is different from the first domain; and
      using the trained model, mapping a first coarse label associated with the coarse label set to a fine label associated with the second domain.

2. The system of claim 1, further comprising: receiving the labeled data from a received input, wherein the labeled data comprises query data associated with the received input.

3. The system of claim 2, further comprising: using the model to provide a result set of a query to the user.

4. The system of claim 1, wherein transforming the first set of labeled data comprises applying canonical correlation analysis (CCA) to the first set of labeled data.

5. The system of claim 1, wherein generating the coarse label set comprises aggregating at least the first vector and the second vector using at least one technique selected from the group consisting of k-means clustering, spectral clustering, affinity propagation, mean-shift, Ward hierarchical clustering, agglomerative clustering, DB SCAN, Gaussian mixtures, and Birch clustering.

6. The system of claim 1, wherein the coarse label set is generalized from the at least two vectors.

7. The system of claim 1, wherein training the model comprises identifying one or more labels that are semantically related to the coarse label set.

8. The system of claim 6, further comprising predicting labels for a target domain using the identified one or more labels.

9. The system of claim 1, wherein the second label shares the commonality of at least the first vector and the second vector.

10. A system for mapping disparate label sets, the system comprising:
- at least one processor; and
- memory coupled to the at least one processor, the memory comprising computer executable instructions that, when executed by the at least one processor, performs a method comprising:
  - accessing a set of labeled data, wherein the set of labeled data comprises data from a first domain and data from a second domain;
  - transforming the set of labeled data into a set of vectors, wherein each of the set of vectors is associated with one or more labels;
  - identifying, in the set of vectors, a first vector comprising labeled data from the first domain and a second vector comprising labeled data from the second domain, wherein a first label of the first vector shares a commonality with a second label of the second vector, wherein the commonality indicates the first label and the second label belong to a shared cluster category;
  - constructing label mappings to map the first vector to the second vector based on the commonality; and
  - using at least the second vector, training a model to perform transfer learning techniques associated with natural language understanding, wherein the transfer learning techniques comprise adapting data in the first domain to the second domain and training the model using a union of data from the first domain and the second domain, the second domain being different from the first domain, and wherein training the model comprises duplicating the set of vectors and conjoining vectors in the duplicated set of vectors with a domain indicator.

11. The system of claim 10, further comprising: receiving the labeled data from a user, wherein the labeled data comprises query data associated with the user.

12. The system of claim 10, wherein transforming the first set of labeled data comprises applying canonical correlation analysis (CCA) to the first set of labeled data.

13. The system of claim 10, wherein the commonality represents that the first vector is a nearest match in the data from the first domain to the second vector, wherein the nearest match is determined using a k-nearest neighbor algorithm.

14. The system of claim 10, wherein mapping comprises generating a bijective mapping between the first vector and the second vector.

15. The system of claim 10, further comprising: using the model to generate a result set.

16. A computer-implemented method for mapping disparate label sets, the method comprising:
- accessing, on a device, a first set of labeled data associated with at least a first domain, wherein the first set of labeled data comprises one or more labels and corresponding data values;
- transforming the first set of labeled data into a set of vectors;
- identifying a commonality between a first label in a first vector from the set of vectors and a second label in a second vector from the set of vectors, wherein the commonality indicates the first label and the second label belong to a shared cluster category;
- based on the identified commonality, generating a coarse label set using at least the first vector and the second vector, wherein the coarse label set represents an abstraction of the first label and the second label;
- using the coarse label set to train a model for a second domain to perform transfer learning techniques associated with natural language understanding, wherein the transfer learning techniques comprise adapting data in the first domain to the second domain and training the model using a union of data from the first domain and the second domain, wherein the second domain is different from the first domain; and
- using the trained model, mapping the one or more labels in the coarse label set to a third label associated with a second set of labeled data.

17. The computer-implemented method of claim 16, further comprising:
- receiving the labeled data from a user, wherein the labeled data comprises query data associated with the user;
- using the model to generate a result set from the query data; and
- providing the result set to the user.

18. The computer-implemented method of claim 16, wherein transforming the first set of labeled data comprises applying canonical correlation analysis (CCA) to the first set of labeled data.

19. The system of claim 1, wherein the first domain is associated with a schema specifying at least one of an intent, a slot, or metadata within the set of labeled data.

20. The system of claim 1, wherein the trained model is used to make predictions on labels within the second domain, wherein the predictions comprise at least one of:
- label correlations derived during label mapping, data regarding synonymous label names, historical mapping data, or slot analysis.

* * * * *